(12) United States Patent
Kinjo et al.

(10) Patent No.: US 11,152,832 B2
(45) Date of Patent: Oct. 19, 2021

(54) ELECTRIC ACTUATOR

(71) Applicant: NIDEC TOSOK CORPORATION, Kanagawa (JP)

(72) Inventors: Shuichi Kinjo, Kanagawa (JP); Hiroshi Shirai, Kanagawa (JP); Yutaka Uematsu, Kanagawa (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 108 days.

(21) Appl. No.: 16/739,070

(22) Filed: Jan. 9, 2020

(65) Prior Publication Data

US 2020/0251951 A1 Aug. 6, 2020

(30) Foreign Application Priority Data

Feb. 5, 2019 (JP) .............................. JP2019-018909

(51) Int. Cl.
*H02K 5/10* (2006.01)
*H02K 7/00* (2006.01)

(52) U.S. Cl.
CPC ............... *H02K 5/10* (2013.01); *H02K 7/003* (2013.01)

(58) Field of Classification Search
CPC .......... F16H 1/28; H02K 7/116; H02K 7/003; H02K 7/088; H02K 5/10
See application file for complete search history.

(56) References Cited

U.S. PATENT DOCUMENTS

2005/0115350 A1* 6/2005 Ohashi .................. B60N 2/067
74/425

FOREIGN PATENT DOCUMENTS

JP 2009247139 10/2009

* cited by examiner

*Primary Examiner* — Terrance L Kenerly
(74) *Attorney, Agent, or Firm* — JCIPRNET

(57) ABSTRACT

An electric actuator includes a motor and a deceleration mechanism. The motor has a motor case having a first opening end surface. The deceleration mechanism has a deceleration mechanism case having a second opening end surface. The motor case and the deceleration mechanism case are connected via a sealing member. The first opening end surface has a first end surface body part and a first end surface protrusion part. The second opening end surface has a second end surface body part and a second end surface protrusion part. The sealing member has a body part sealing part and a protrusion part sealing part. The protrusion part sealing part has an axial-direction protrusion that faces a side surface of the motor case in the first end surface protrusion part or a side surface of the deceleration mechanism case in the second end surface protrusion part in a circumferential direction.

9 Claims, 7 Drawing Sheets

ELECTRIC ACTUATOR

CROSS REFERENCE TO RELATED APPLICATION

This application claims the priority benefit of Japan Application No. 2019-018909, filed on Feb. 5, 2019. The entirety of the above-mentioned patent application is hereby incorporated by reference herein and made a part of this specification.

BACKGROUND

Technical Field

The disclosure relates to an electric actuator.

Description of Related Art

Conventionally, in an electric actuator that connects a motor and gears, there is a known configuration in which a sealing member for ensuring waterproofness is disposed on a mating surface between a case part which houses the motor and a case part which houses the gears (see Patent Document 1).

RELATED ART

Patent Document

[Patent Document 1] Japanese Laid-open No. 2009-247139

Technical Problem

When the two case parts are fixed with the sealing member interposed therebetween, the assembly work is complicated because the sealing member may drop from the case part or the position of the sealing member may be shifted.

Solution to the Problem

SUMMARY

According to an embodiment of the disclosure, an electric actuator is provided, which includes a motor and a deceleration mechanism. The motor includes a rotor having a motor shaft extending along a central axis, and a stator facing the rotor in a radial direction. The deceleration mechanism is connected to one axial-direction side of the motor shaft. The motor includes a motor case having a first opening end surface that opens on the one axial-direction side. The deceleration mechanism includes a deceleration mechanism case having a second opening end surface that opens on an other axial-direction side. The motor case and the deceleration mechanism case are connected in an axial direction via an annular sealing member disposed between the first opening end surface and the second opening end surface. The first opening end surface includes a first end surface body part in a circular arc shape extending in a circumferential direction, and a first end surface protrusion part protruding in an arc shape from the first end surface body part toward a radial-direction outer side. The second opening end surface includes a second end surface body part in a circular arc shape extending in the circumferential direction, and a second end surface protrusion part protruding in an arc shape from the second end surface body part toward the radial-direction outer side and facing the first end surface protrusion part. The sealing member includes a body part sealing part disposed between the first end surface body part and the second end surface body part, and a protrusion part sealing part disposed between the first end surface protrusion part and the second end surface protrusion part. The protrusion part sealing part includes an axial-direction protrusion that protrudes from a surface directed to the axial direction toward the one axial-direction side or the other axial-direction side. The axial-direction protrusion faces a side surface of the motor case in the first end surface protrusion part or a side surface of the deceleration mechanism case in the second end surface protrusion part in the circumferential direction.

DESCRIPTION OF THE EMBODIMENTS

According to an aspect of the disclosure, an electric actuator is provided, which can efficiently and easily realize the connection between the motor case and the deceleration mechanism case via the sealing member and is excellent in assembly workability.

The Z-axis direction in each drawing is a vertical direction in which the positive side is the upper side and the negative side is the lower side. The axial direction of a central axis J1 appropriately shown in each drawing is parallel to the Z-axis direction, that is, the vertical direction. In the following description, a direction parallel to the axial direction of the central axis J1 is simply referred to as the "axial direction Z." Further, the X-axis direction and the Y-axis direction appropriately shown in each drawing are horizontal directions orthogonal to the axial direction Z and are directions orthogonal to each other. In the following description, a direction parallel to the X-axis direction is referred to as the "first direction X," and a direction parallel to the Y-axis direction is referred to as the "second direction Y."

Further, a radial direction with the central axis J1 as the center is simply referred to as the "radial direction," and a circumferential direction with the central axis J1 as the center is simply referred to as the "circumferential direction." In the embodiment, the upper side corresponds to the other axial-direction side, and the lower side corresponds to one axial-direction side. Further, the vertical direction, the horizontal direction, the upper side and the lower side are simply names for explaining the relative positional relationship of each part, and the actual dispositional relationship and the like may be other than the dispositional relationship and the like indicated by these names.

Figure 1:
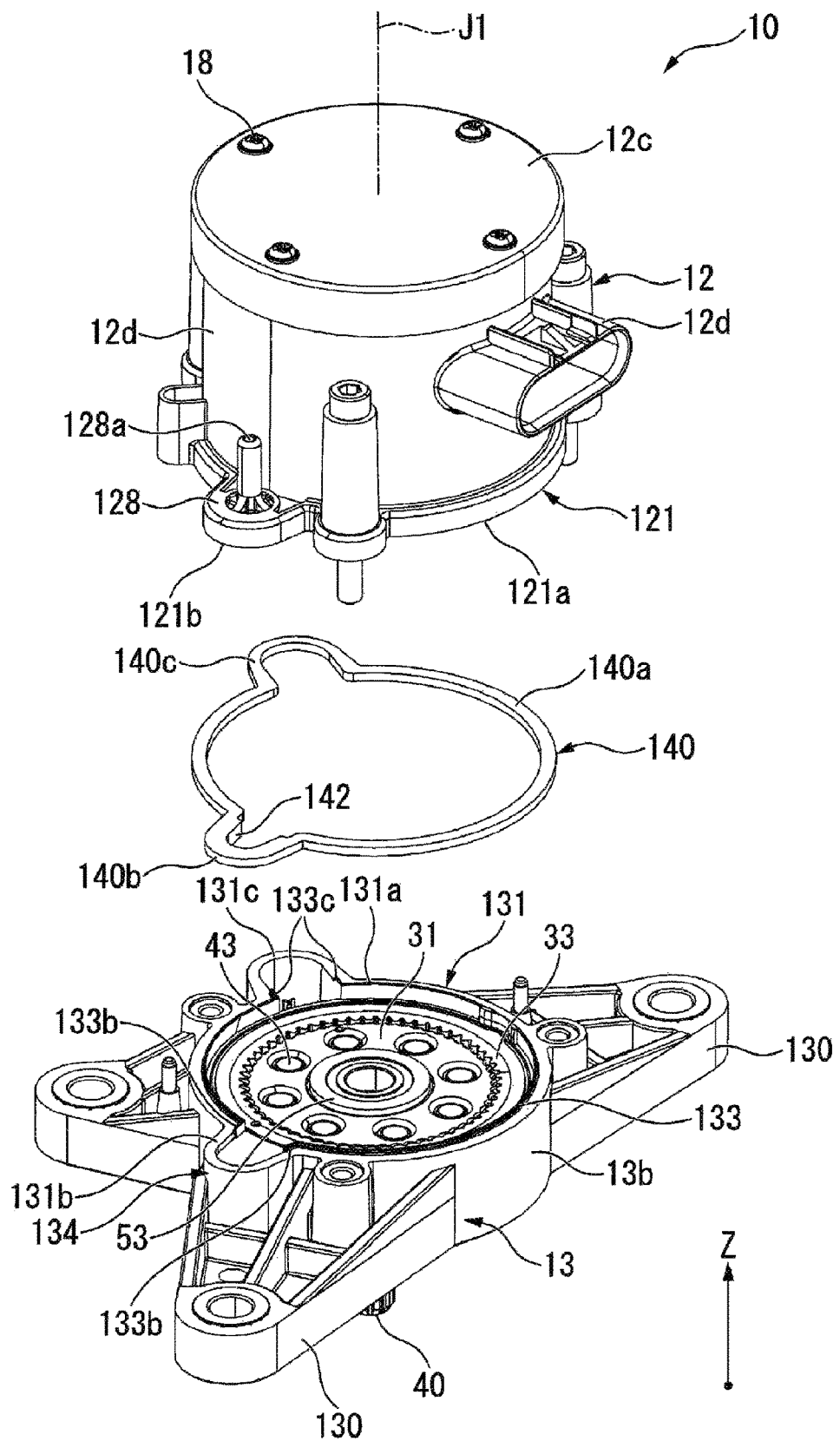
FIG. 1 is an exploded perspective view of an electric actuator according to an embodiment.
Figure 2:
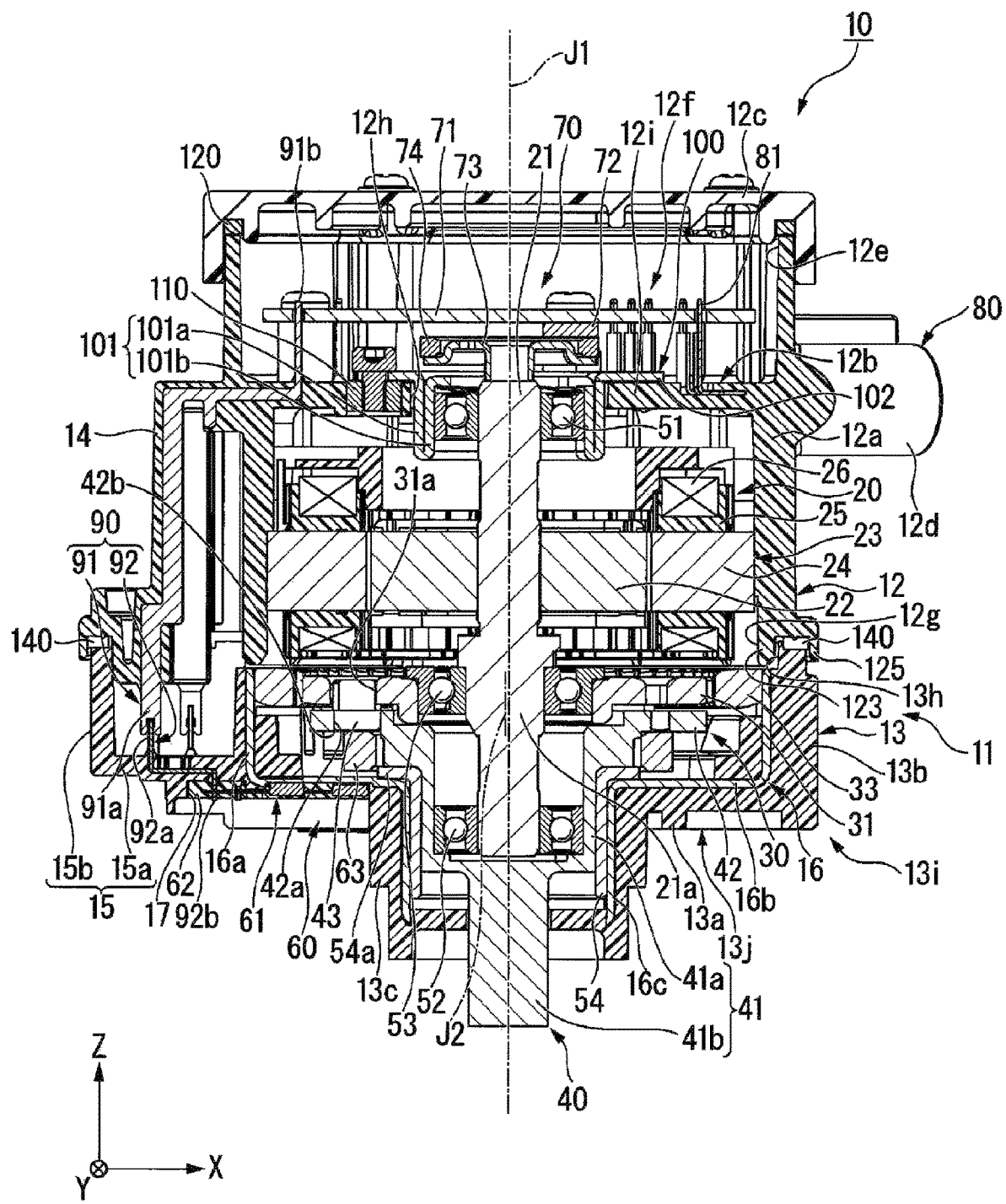
FIG. 2 is a cross-sectional view of the electric actuator according to the embodiment.

As shown in FIG. 1 and FIG. 2, an electric actuator 10 of the embodiment includes a case 11, a bearing holder 100, a motor 20 having a motor shaft 21 extending in the axial direction Z of the central axis J1, a control part 70, a connector part 80, a deceleration mechanism 30, an output part 40, a wiring member 90, a rotation detection device 60, a first bearing 51, a second bearing 52, a third bearing 53, and a bush 54. The first bearing 51, the second bearing 52, and the third bearing 53 are, for example, ball bearings.

The case 11 accommodates the motor 20 and the deceleration mechanism 30. The case 11 includes a motor case 12 in which the motor 20 is accommodated and a deceleration mechanism case 13 in which the deceleration mechanism 30 is accommodated. That is, the electric actuator 10 has the motor case 12. The motor case 12 includes a case cylinder part 12a, a wall part 12b, a control board accommodating part 12f, a lid body 12c, a terminal holding part 12d, and a first wiring holding part 14. Each part of the motor case 12 is made of resin except for a metal member 110 to be described later.

The case cylinder part 12a is in a cylindrical shape that extends in the axial direction Z with the central axis J1 as the center. The case cylinder part 12a opens on both sides in the axial direction Z. The case cylinder part 12a includes an opening part 12e that opens on the upper side and an opening part 12g that opens on the lower side. The case cylinder part 12a surrounds the radial-direction outer side of the motor 20.

The wall part 12b is in an annular shape that expands from the inner circumferential surface of the case cylinder part 12a toward the radial-direction inner side. The wall part 12b covers the upper side of a stator 23 (to be described later) of the motor 20. The wall part 12b includes a hole part 12h penetrating the wall part 12b in the axial direction Z. In the embodiment, the hole part 12h is in a circular shape with the central axis J1 as the center. The inner diameter of the hole part 12h is greater than the outer diameter of a holder cylinder part 101 to be described later. The wall part 12b includes a wall part body 12i made of resin, and the metal member 110 made of metal. The wall part body 12i is part of the annular shape that expands from the inner circumferential surface of the case cylinder part 12a toward the radial-direction inner side.

The metal member 110 is in an annular shape and has an internal thread part on the inner circumferential surface. The metal member 110 is, for example, a nut. The metal member 110 is embedded in the wall part body 12i. The metal member 110 is located at a position away from the radial-direction inner-side surface of the hole part 12h toward the radial-direction outer side. A plurality of metal members 110 are provided. The plurality of metal members 110 are disposed at equal intervals all around along the circumferential direction. For example, three metal members 110 are provided.

The control board accommodating part 12f is a part accommodating a control board 71 to be described later. The control board accommodating part 12f is configured on the radial-direction inner side of the upper-side part of the case cylinder part 12a. The bottom surface of the control board accommodating part 12f is the top surface of the wall part 12b. The control board accommodating part 12f opens on the upper side. The lid body 12c is a lid in a plate shape that closes the upper-end opening of the control board accommodating part 12f. The terminal holding part 12d protrudes from the case cylinder part 12a toward the radial-direction outer side. The terminal holding part 12d is in a cylindrical shape that opens on the radial-direction outer side. The terminal holding part 12d holds a terminal 81 to be described later.

The lid body 12c closes an opening part on the upper side of the case cylinder part 12a. The lid body 12c closes an opening on the upper side of the control board accommodating part 12f located on the upper side of the case cylinder part 12a. The lid body 12c is removably mounted to the case cylinder part 12a using four screws 18. A connection part between the lid body 12c and the case cylinder part 12a is sealed by the annular sealing member 120.

The first wiring holding part 14 protrudes from the case cylinder part 12a toward the radial-direction outer side, as shown in FIG. 2. In FIG. 2, the first wiring holding part 14 protrudes from the case cylinder part 12a toward the negative side of the first direction X. The first wiring holding part 14 extends in the axial direction Z. The axial-direction position of the upper end part of the first wiring holding part 14 is substantially the same as the axial-direction position of the wall part 12b. The circumferential-direction position of the first wiring holding part 14 is, for example, different from the circumferential-direction position of the connector part 80.

The deceleration mechanism case 13 is located on the lower side of the motor case 12. The deceleration mechanism case 13 includes a deceleration mechanism case body 13i and a cylindrical member 16. The deceleration mechanism case body 13i is made of resin. The deceleration mechanism case body 13i includes a bottom wall part 13a, a cylinder part 13b, a protruding cylinder part 13c, and a second wiring holding part 15. The bottom wall part 13a is in an annular shape with the central axis J1 as the center. The bottom wall part 13a covers the lower side of the deceleration mechanism 30.

The cylinder part 13b is in a cylindrical shape that protrudes from the radial-direction outer edge part of the bottom wall part 13a toward the upper side. The cylinder part 13b opens on the upper side. The upper end part of the cylinder part 13b contacts and is fixed to the lower end part of the case cylinder part 12a. The protruding cylinder part 13c is in a cylindrical shape that protrudes from the radial-direction inner edge part of the bottom wall part 13a toward the lower side. The protruding cylinder part 13c opens on both sides in the axial direction.

The second wiring holding part 15 protrudes from the cylinder part 13b toward the radial-direction outer side. In FIG. 2, the second wiring holding part 15 protrudes from the cylinder part 13b toward the negative side of the first direction X, that is, the same side as the side toward which the first wiring holding part 14 protrudes. The second wiring holding part 15 is disposed on the lower side of the first wiring holding part 14. The second wiring holding part 15 is, for example, in a box shape that is hollow and opens on the upper side. The inside of the second wiring holding part 15 is connected to the inside of the cylinder part 13b. The second wiring holding part 15 includes a bottom wall part 15a and a side wall part 15b. The bottom wall part 15a extends from the bottom wall part 13a toward the radial-direction outer side. In FIG. 2, the bottom wall part 15a extends from the bottom wall part 13a toward the negative side of the first direction X. The side wall part 15b extends from the outer edge part of the bottom wall part 15a toward the upper side. In the embodiment, the bottom part 13j of the deceleration mechanism case body 13i is configured by the bottom wall part 13a and the bottom wall part 15a.

The cylindrical member 16 is in a cylindrical shape that extends in the axial direction Z. More specifically, the cylindrical member 16 is in a multistage cylindrical shape that opens on both sides in the axial direction with the central axis J1 as the center. The cylindrical member 16 is made of metal. In the embodiment, the cylindrical member 16 is made of sheet metal. Therefore, the cylindrical member 16 can be manufactured by press-processing a metal plate, and the manufacturing cost of the cylindrical member 16 can be reduced. In the embodiment, the cylindrical member 16 is made of a non-magnetic material.

The cylindrical member 16 is embedded in the deceleration mechanism case body 13i. The cylindrical member 16 includes a large diameter part 16a, an annular part 16b, and a small diameter part 16c. The large diameter part 16a is the upper-side part of the cylindrical member 16. The large diameter part 16a is embedded in the cylinder part 13b. The end part on the upper side of the inner circumferential surface of the large diameter part 16a is exposed to the inside of the deceleration mechanism case 13.

As shown in FIG. 2, the annular part 16b is an annular part that extends from the end part on the lower side of the large diameter part 16a toward the radial-direction inner side. In the embodiment, the annular part 16b is in an annular plate shape with the central axis J1 as the center. The annular part 16b is disposed on the bottom wall part 13a. In the embodiment, the annular part 16b is located on a surface on the upper side of the bottom wall part 13a. The radial-direction outer edge part of the annular part 16b is embedded in the cylinder part 13b. A part of the top surface of the annular part 16b which is close to the radial-direction inner side is exposed to the inside of the deceleration mechanism case 13. The annular part 16b covers the lower side of a first magnet 63 to be described later. The top surface of the annular part 16b is a flat surface orthogonal to the axial direction Z.

The small diameter part 16c is a lower-side part of the cylindrical member 16. The small diameter part 16c extends from the radial-direction inner edge part of the annular part 16b toward the lower side. The outer diameter and the inner diameter of the small diameter part 16c are smaller than the outer diameter and the inner diameter of the large diameter part 16a. The small diameter part 16c is fitted to the radial-direction inner side of the protruding cylinder part 13c. The bush 54 in a cylindrical shape extending in the axial direction Z is disposed inside the small diameter part 16c. The bush 54 is fitted to the small diameter part 16c and is fixed inside the protruding cylinder part 13c. The bush 54 has a bush flange part 54a protruding toward the radial-direction outer side at the upper end part. The bush flange part 54a is in contact with the top surface of the annular part 16b. Accordingly, the bush 54 is prevented from coming off toward the lower side from the inside of the small diameter part 16c.

The deceleration mechanism case 13 has an opening part 13h that opens on the upper side. In the embodiment, the opening part 13h is configured by the opening on the upper side of the cylinder part 13b and the opening on the upper side of the second wiring holding part 15. The motor case 12 and the deceleration mechanism case 13 are fixed to each other in a state where the opening part 12g and the opening part 13h face each other in the axial direction Z.

Figure 3:
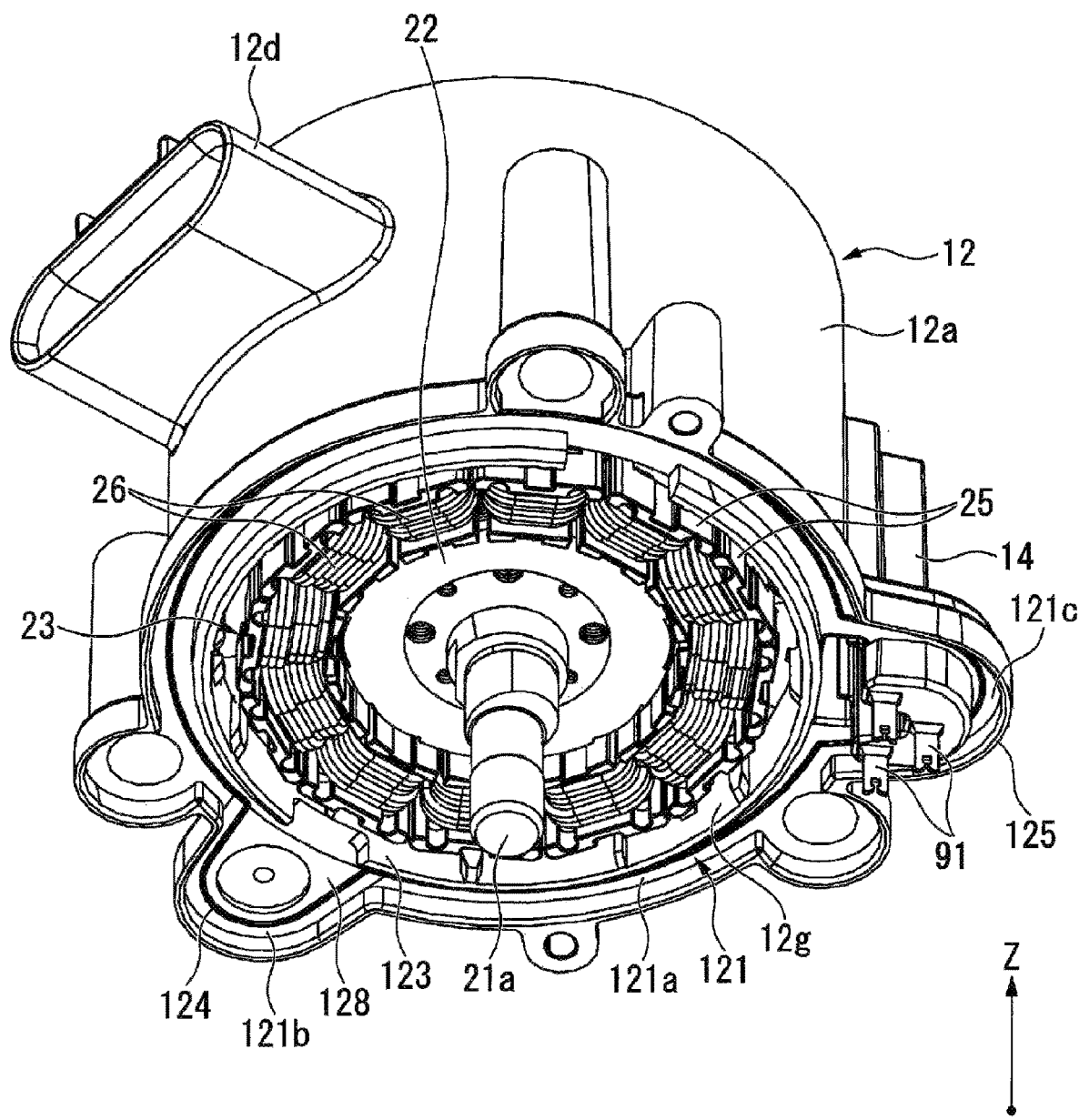
FIG. 3 is a perspective view showing a first opening end surface of a motor case.

More specifically, the opening part 12g of the motor case 12 is surrounded by a first opening end surface 121 that faces the lower side of the case cylinder part 12a as shown in FIG. 1 and FIG. 3. The opening part 13h of the deceleration mechanism case 13 is surrounded by a second opening end surface 131 that faces the upper side of the cylinder part 13b shown in FIG. 1. The motor case 12 and the deceleration mechanism case 13 are connected in the axial direction via the annular sealing member 140 disposed between the first opening end surface 121 and the second opening end surface 131. In a state where the motor case 12 and the deceleration mechanism case 13 are fixed to each other, the inside of the opening part 12g and the inside of the opening part 13h are connected to each other.

As shown in FIG. 3, the first opening end surface 121 of the motor case 12 includes a first end surface body part 121a in a circular arc shape that extends in the circumferential direction, and two first end surface protrusion parts 121b and 121c that protrude in a circular arc shape from the first end surface body part 121a toward the radial-direction outer side.

As shown in FIG. 1 and FIG. 3, the motor case 12 includes a breathing part 128 that protrudes from a side surface of the case cylinder part 12a toward the radial-direction outer side. One first end surface protrusion part 121b is located on the outer circumferential part of the surface that faces the lower side of the breathing part 128. The other first end surface protrusion part 121c is located on the outer circumferential part of the surface that faces the lower side of the first wiring holding part 14, which protrudes from the case cylinder part 12a toward the radial-direction outer side.

The motor case 12 includes an annular convex part 124 that protrudes from the first opening end surface 121 toward the lower side on the surface of the first opening end surface 121. The annular convex part 124 is in an annular shape that extends along the first opening end surface 121. The annular convex part 124 is located at the central part of the radial-direction width on the surface of the first opening end surface 121. By providing the annular convex part 124, when the motor case 12 and the deceleration mechanism case 13 are connected, the sealing member 140 can be partially strongly pressed by the annular convex part 124, and the sealing of the connection part between the motor case 12 and the deceleration mechanism case 13 is improved.

Figure 8:
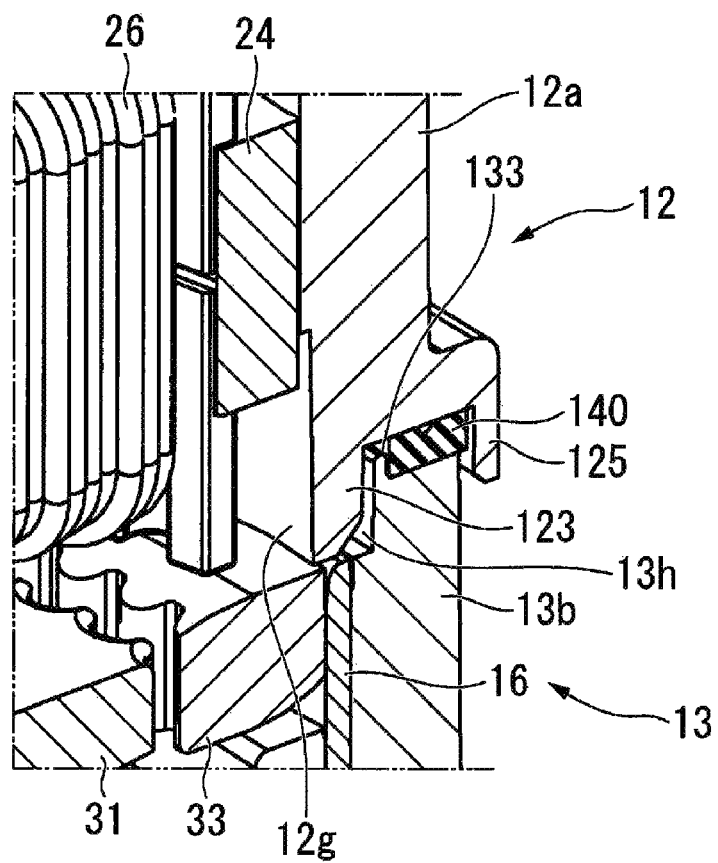
FIG. 8 is a cross-sectional view enlarging and showing a connecting portion between the motor case and the deceleration mechanism case.

The motor case 12 includes an inner side wall part 123 that protrudes from the first opening end surface 121 toward the lower side, and a first positioning wall part 125. The inner side wall part 123 is located on the inner circumferential side of the first opening end surface 121. The inner side wall part 123 is in a circular arc shape that extends in the circumferential direction along the first opening end surface 121. The inner side wall part 123 is located at the inner circumferential end of the first opening end surface 121. The inner side wall part 123 extends along the outer circumferential end of the opening part 12g of the motor case 12. As shown in FIG. 8, the inner side wall part 123 is inserted into the inner side the opening part 13h of the deceleration mechanism case 13. The end part on the lower side of the inner side wall part 123 functions as a retainer for an internal gear 33 located on the lower side of the inner side wall part 123. The outer circumferential surface of the inner side wall part 123 faces the inner circumferential surface of a second positioning wall part 133 (to be described later) with a gap therebetween in the radial direction.

The first positioning wall part 125 is located at the outer circumferential end of the first opening end surface 121. The first positioning wall part 125 protrudes from the first opening end surface 121 toward the lower side. The first positioning wall part 125 extends along the circumferential edge of the end part on the lower side of the motor case 12. The first positioning wall part 125 faces the inner side wall part 123 on the inner circumferential side in the radial direction. As shown in FIG. 2 and FIG. 8, the sealing member 140 is disposed between the first positioning wall part 125 and the second positioning wall part 133 to be described later. According to this configuration, the radial-direction movement of the sealing member 140 is suppressed by the first positioning wall part 125 and the second positioning wall part 133. The sealing member 140 can be maintained in the correct position, and the connection part between the motor case 12 and the deceleration mechanism case 13 can be properly sealed.

As shown in FIG. 1, the second opening end surface 131 of the deceleration mechanism case 13 includes a second end surface body part 131a in a circular arc shape that extends in the circumferential direction, and two second end surface protrusion parts 131b and 131c that protrude in a circular arc shape from the second end surface body part 131a toward the radial-direction outer side.

Figure 6:
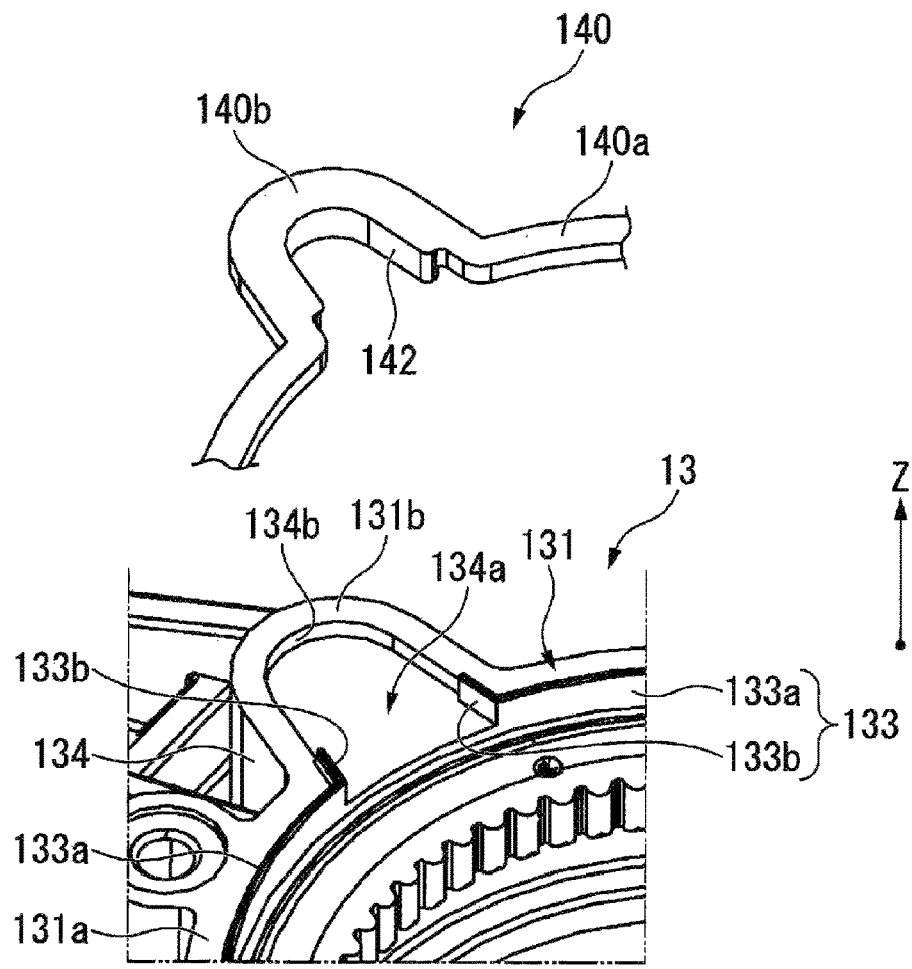
FIG. 6 is a partial perspective view showing a second opening end surface of the deceleration mechanism case and the sealing member.

The second end surface protrusion part 131b is located on the top surface of a lateral protrusion part 134 that protrudes from the cylinder part 13b of the deceleration mechanism case 13 toward the radial-direction outer side. The second end surface protrusion part 131b is an elongated surface that extends along the outer circumferential end of the lateral protrusion part 134 as seen from the upper side. The lateral protrusion part 134 has a concave part 134a on the top surface. The concave part 134a is located on the inner side of the second end surface protrusion part 131b. The axial-direction position of the top surface of the concave part 134a is lower than the axial-direction position of the top surface of the second end surface protrusion part 131b. As shown in FIG. 6, the lateral protrusion part 134 includes an inner circumferential wall 134b which is a step surface between the bottom surface of the concave part 134a and the second end surface protrusion part 131b.

The second end surface protrusion part 131b faces the first end surface protrusion part 121b of the motor case 12 in the axial direction. The second end surface protrusion part 131c is the upper end surface of the side wall part 15b of the second wiring holding part 15. The second end surface protrusion part 131c faces the first end surface protrusion part 121c of the motor case 12 in the axial direction.

Figure 4:
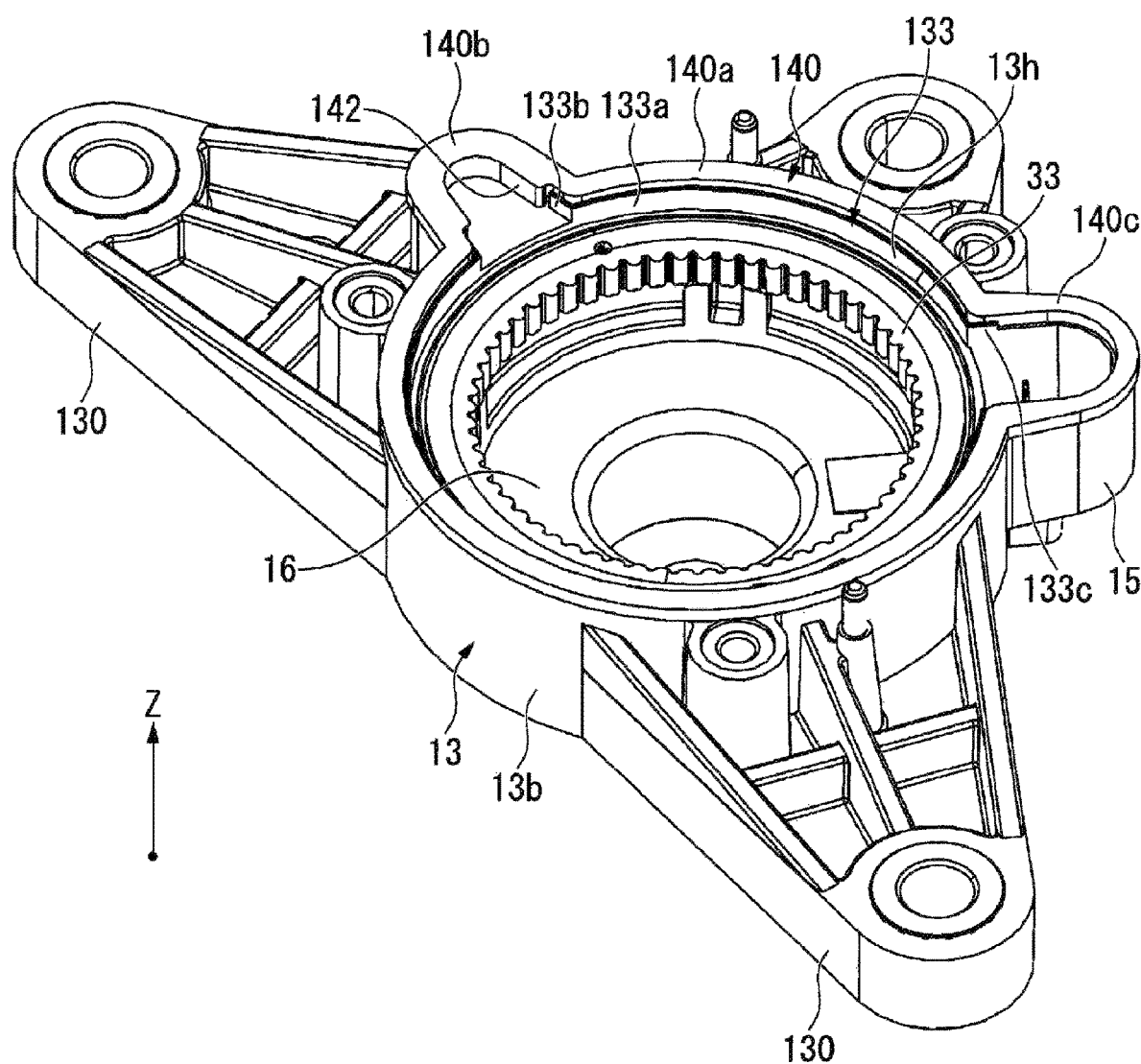
FIG. 4 is a perspective view showing a state where a sealing member is disposed in a deceleration mechanism case.

The deceleration mechanism case 13 includes the second positioning wall part 133 that protrudes from the second opening end surface 131 toward the upper side. The second positioning wall part 133 extends along the second opening end surface 131. According to this configuration, as shown in FIG. 4, when the sealing member 140 is placed on the second opening end surface 131, the sealing member 140 can be disposed along the second positioning wall part 133. Accordingly, the sealing member 140 can be easily positioned.

In the embodiment, the second positioning wall part 133 is located at the inner circumferential end of the second opening end surface 131. According to this configuration, the sealing member 140 can be prevented from entering the inner side of the opening part 13h. As a result, the sealing member 140 does not easily move during the assembly work, and the worker can perform the assembly work efficiently.

The second positioning wall part 133 includes a wall part body 133a that extends in a circular arc shape along the circumferential direction, and protruding wall parts 133b and 133c that extend from the circumferential-direction end part of the wall part body 133a toward the radial-direction outer side. The protruding wall part 133b protrudes in the radial direction along the second end surface protrusion part 131b at the corner between the second end surface body part 131a and the second end surface protrusion part 131b. The protruding wall part 133c protrudes in the radial direction along the second end surface protrusion part 131c at the corner between the second end surface body part 131a and the second end surface protrusion part 131c.

The sealing member 140 is, for example, a thin plate-shaped ring made of a rubber material. The sealing member 120 has substantially the same planar shape as the first opening end surface 121 and the second opening end surface 131. That is, the sealing member 120 is in a substantially annular shape that extends along the circumferential direction. The sealing member 140 includes a body part sealing part 140a that extends in a circular arc shape along the circumferential direction, and protrusion part sealing parts 140b and 140c that protrude in a circular arc shape toward the radial-direction outer side at two locations in the circumferential direction of the sealing member 140.

Figure 5:
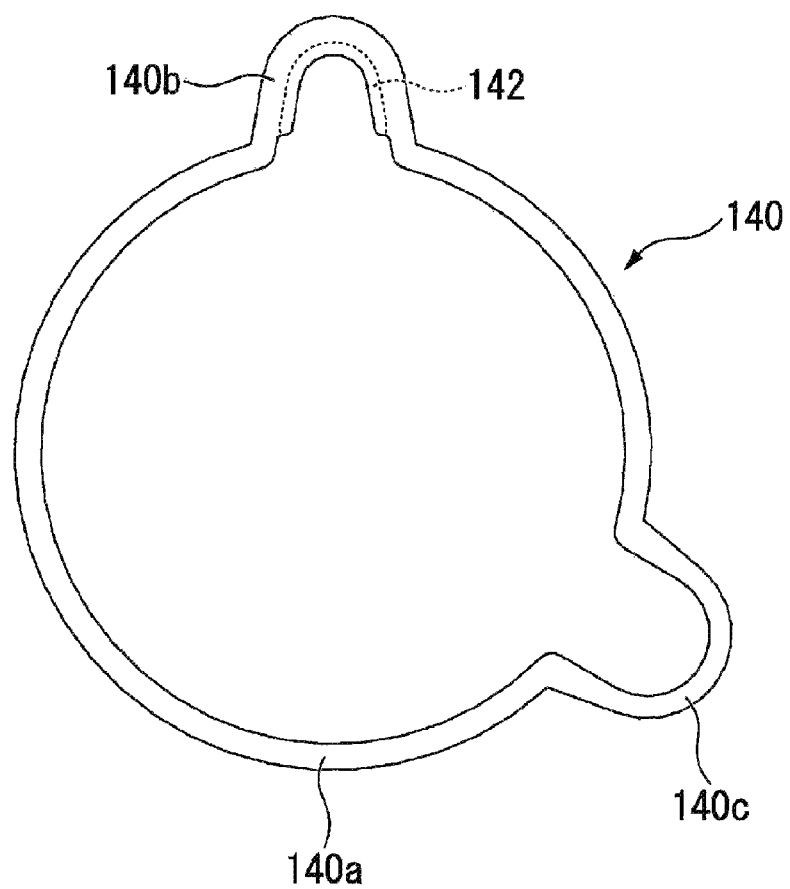
FIG. 5 is a plan view of the sealing member.
Figure 7:
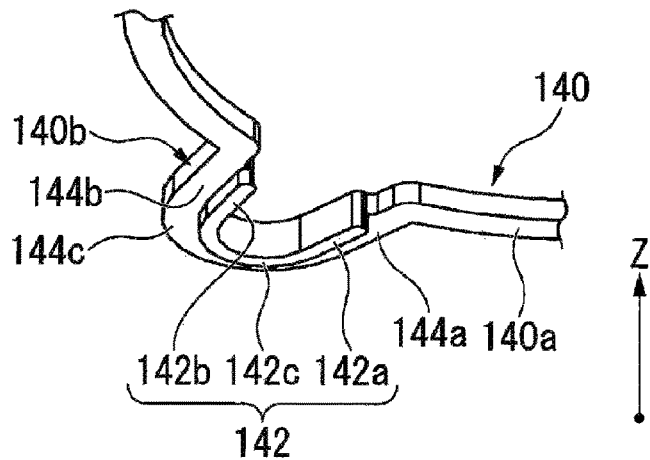
FIG. 7 is a partial perspective view of the sealing member as seen from the lower side.

As shown in FIG. 5, the protrusion part sealing part 140b includes an axial-direction protrusion 142 that protrudes toward the lower side from the surface facing the lower side of the protrusion part sealing part 140b. As shown in FIG. 5 and FIG. 7, the axial-direction protrusion 142 is in an arc shape that extends along the end part on the inner circumferential side of the protrusion part sealing part 140b when seen in the axial direction Z.

More specifically, the protrusion part sealing part 140b includes a first arm 144a and a second arm 144b that extend from the connection part with the body part sealing part 140a toward the radial-direction outer side, and a connecting part 144c in a circular arc shape that connects an end part on the radial-direction outer side of the first arm 144a and an end part on the radial-direction outer side of the second arm 144b.

The first arm 144a includes a circumferential-direction positioning protrusion 142a that protrudes from the end part on the inner circumferential side of the first arm 144a toward the lower side. The second arm 144b includes a circumferential-direction positioning protrusion 142b that protrudes from the end part on the inner circumferential side of the second arm 144b toward the lower side. The connecting part 144c includes a radial-direction positioning protrusion 142c in a circular arc shape that protrudes from the end part on the inner circumferential side of the connecting part 144c toward the lower side.

The circumferential-direction positioning protrusion 142a is connected to the end part on one side of the radial-direction positioning protrusion 142c at the end part on the radial-direction outer side. The end part on the other side of the radial-direction positioning protrusion 142c is connected to the end part on the radial-direction outer side of the circumferential-direction positioning protrusion 142b.

The sealing member 140 is placed on the second opening end surface 131 of the deceleration mechanism case 13, as shown in FIG. 4. The body part sealing part 140a of the sealing member 140 is disposed on the surface of the second end surface body part 131a. One protrusion part sealing part 140b is disposed on the surface of the second end surface protrusion part 131b. The other protrusion part sealing part 140c is disposed on the surface of the second end surface protrusion part 131c.

In a state where the sealing member 140 is placed on the second opening end surface 131, as shown in FIG. 4 and FIG. 5, the axial-direction protrusion 142 of the protrusion part sealing part 140b is inserted into the concave part 134a on the top surface of the lateral protrusion part 134.

The axial-direction protrusion 142 is disposed along the inner circumferential wall 134b that surrounds the concave part 134a. The circumferential-direction positioning protrusions 142a and 142b respectively face the wall surfaces, which are directed in the circumferential direction, of the inner circumferential wall 134b in the circumferential direction. That is, the axial-direction protrusion 142 faces the side surface of the deceleration mechanism case 13 in the circumferential direction. The radial-direction positioning protrusion 142c faces the wall surface, which is directed to the radial-direction inner side, of the inner circumferential wall 134b in the radial direction.

According to the above configuration, the movement of the sealing member 140, which is disposed on the second opening end surface 131, in the circumferential direction and the radial direction is limited by the axial-direction protrusion 142 inserted into the concave part 134a. Accordingly, the sealing member 140 is positioned on the second opening end surface 131. According to the embodiment, the worker can easily dispose the sealing member 140 in the correct position on the second opening end surface 131. In addition, since the sealing member 140 disposed on the second opening end surface 131 does not easily move during the assembly work, the worker can efficiently assemble the electric actuator 10.

In the embodiment, the protrusion part sealing part 140b faces the protruding wall part 133b in the circumferential direction at two base end parts on the radial-direction inner side. With this configuration, the movement of the first arm 144a to both sides in the circumferential direction is limited by the circumferential-direction positioning protrusion 142a and the protruding wall part 133b. Further, the movement of the second arm 144b to both sides in the circumferential direction is limited by the circumferential-direction positioning protrusion 142b and the protruding wall part 133b. As a result, the first arm 144a and the second arm 144b are substantially fixed on the second opening end surface 131. Therefore, according to the embodiment, it is very difficult for the sealing member 140 to move during the assembly work, and the worker can efficiently perform the assembly work.

Although the axial-direction protrusion 142 of the embodiment is in an arc shape that extends along the inner circumference of the protrusion part sealing part 140b, the circumferential-direction positioning protrusions 142a and 142b and the radial-direction positioning protrusion 142c may not be connected to each other. In such a case, the sealing member 140 can still be positioned on the second opening end surface 131 by the axial-direction protrusion 142. On the other hand, like the embodiment, by providing the axial-direction protrusion 142 in an arc shape extending along the protrusion part sealing part 140b, the length in which the axial-direction protrusion 142 and the inner circumferential wall 134b face each other is increased so the sealing member 140 can be positioned accurately.

The axial-direction protrusion 142 may be configured without the radial-direction positioning protrusion 142c. In this configuration, since the movement of the sealing member 140 in the circumferential direction is limited by the two circumferential-direction positioning protrusions 142a and 142b, the sealing member 140 can still be positioned on the second opening end surface 131.

Furthermore, the axial-direction protrusion 142 may be configured to include only one of the two circumferential-direction positioning protrusions 142a and 142b. For example, in the case where the axial-direction protrusion 142 includes only the circumferential-direction positioning protrusion 142a of the first arm 144a, the first arm 144a can still be substantially fixed in the circumferential direction by the circumferential-direction positioning protrusion 142a and the protruding wall part 133b so the sealing member 140 can be positioned in the circumferential direction. Even if the axial-direction protrusion 142 includes only the circumferential-direction positioning protrusion 142a and the deceleration mechanism case 13 is not provided with the protruding wall part 133b, the sealing member 140 can still be positioned on the second opening end surface 131 because the movement to at least one side in the circumferential direction is limited by the circumferential-direction positioning protrusion 142a.

Although in the embodiment the axial-direction protrusion 142 protrudes to the lower side of the sealing member 140 on the premise of the process of placing the sealing member 140 on the second opening end surface 131 that faces the upper side, the disclosure is not limited to this configuration. For example, during the assembly work, the first opening end surface 121 of the motor case 12 may be directed toward the upper side, and the sealing member 140 may be placed on the first opening end surface 121. When the sealing member 140 is placed on the first opening end surface 121, it is preferable that the axial-direction protrusion 142 of the sealing member 140 protrudes toward the side of the motor case 12. According to this configuration, by placing the sealing member 140 on the first opening end surface 121 of the motor case 12, the axial-direction protrusion 142 and a part of the side surface of the motor case 12 can face each other in the circumferential direction. Accordingly, the sealing member 140 can be substantially fixed in a state of being positioned on the first opening end surface 121 by the axial-direction protrusion 142. Therefore, the sealing member 140 does not easily move during the assembly work, and the assembly workability of the electric actuator 10 is improved.

In the embodiment, the motor case 12 and the deceleration mechanism case 13 are each made, for example, by insert molding. The motor case 12 is made by insert molding using the metal member 110 and a first wiring member 91 (to be described later) of the wiring members 90 as insert members. The deceleration mechanism case 13 is made by insert molding using the cylindrical member 16 and a second wiring member 92 (to be described later) of the wiring members 90 as insert members.

The case 11 has a concave part 17 located on the outer surface of the case 11. In the embodiment, the concave part 17 is provided in the deceleration mechanism case 13. More specifically, the concave part 17 is recessed from the surface on the lower side of the bottom part 13j toward the upper side. In the embodiment, the concave part 17 is provided across the bottom wall part 13a and the bottom wall part 15a. The concave part 17 extends in the radial direction. In the embodiment, the direction in which the concave part 17 extends is a direction parallel to the first direction X among the radial directions.

The bearing holder 100 is fixed to the motor case 12. The bearing holder 100 is made of metal. In the embodiment, the bearing holder 100 is made of sheet metal. Therefore, the bearing holder 100 can be manufactured by press-processing a metal plate, and the manufacturing cost of the bearing holder 100 can be reduced. The bearing holder 100 includes a cylindrical holder cylinder part 101 and a holder flange part 102. In the embodiment, the holder cylinder part 101 is in a cylindrical shape with the central axis J1 as the center. The holder cylinder part 101 holds the first bearing 51 on the radial-direction inner side. The holder cylinder part 101 is inserted into the hole part 12h. The holder cylinder part 101 protrudes from the inside of the control board accommodating part 12f further toward the lower side with respect to the wall part 12b via the hole part 12h.

The outer diameter of the holder cylinder part 101 is smaller than the inner diameter of the hole part 12h. Therefore, at least a part in the circumferential direction of the radial-direction outer-side surface of the holder cylinder part 101 is located at a position away from the radial-direction inner-side surface of the hole part 12h toward the radial-direction inner side. In the example shown in FIG. 2, the radial-direction outer-side surface of the holder cylinder part 101 is located away from the radial-direction inner-side surface of the hole part 12h toward the radial-direction inner side over the entire circumference.

In the embodiment, the holder cylinder part 101 includes an outer cylinder part 101a and an inner cylinder part 101b. The outer cylinder part 101a is in a cylindrical shape extending from the radial-direction inner edge part of the holder flange part 102 toward the lower side. The radial-direction outer-side surface of the outer cylinder part 101a is the radial-direction outer-side surface of the holder cylinder part 101. The inner cylinder part 101b is in a cylindrical shape extending from the end part on the lower side of the outer cylinder part 101a on the radial-direction inner side of the outer cylinder part 101a toward the upper side. The radial-direction outer-side surface of the inner cylinder part 101b is in contact with the radial-direction inner-side surface of the outer cylinder part 101a. Thus, the strength of the holder cylinder part 101 can be improved by configuring the holder cylinder part 101 with the two cylinder parts overlapping in the radial direction. The first bearing 51 is held on the radial-direction inner side of the inner cylinder part 101b. The end part on the upper side of the inner cylinder part 101b is located on the upper side with respect to the first bearing 51. The end part on the upper side of the inner cylinder part 101b is located slightly lower than the end part on the upper side of the outer cylinder part 101a.

The holder flange part 102 extends from the holder cylinder part 101 toward the radial-direction outer side. In the embodiment, the holder flange part 102 extends from the end part on the upper side of the holder cylinder part 101 toward the radial-direction outer side. The holder flange part 102 is in an annular plate shape with the central axis J1 as the center. The holder flange part 102 is located on the upper side of the wall part 12b. The holder flange part 102 is fixed to the wall part 12b. Accordingly, the bearing holder 100 is fixed to the motor case 12.

In the embodiment, the holder flange part 102 is fixed to the wall part 12b by a plurality of screw members tightened to the wall part 12b in the axial direction Z. In the embodiment, the screw members for fixing the holder flange part 102 are tightened to the internal thread part of the metal member 110 on the wall part 12b. Although illustration is omitted, for example, three screw members for fixing the holder flange part 102 are provided.

The holder flange part 102 fixed by the screw members is in contact with the surface on the upper side of the metal member 110. More specifically, the circumferential edge part of a penetrating part, through which the screw members penetrate, on the surface on the lower side of the holder flange part 102 is in contact with the surface on the upper side of the metal member 110. The holder flange part 102 is located at a position away from the wall part body 12i toward the upper side. Therefore, the holder flange part 102 can be positioned accurately in the axial direction Z by the metal member 110. In addition, the holder flange part 102 can be suppressed from being inclined with respect to the axial direction Z. Moreover, the holder flange part 102 is not in direct contact with the wall part body 12i. Therefore, even when a difference in thermal deformation occurs between the wall part body 12i made of resin and the metal member 110 made of metal due to a difference in linear expansion coefficient, stress can be prevented from being applied to the wall part body 12i. Thereby, the wall part body 12i can be prevented from being damaged and the metal member 110 can be prevented from coming off the wall part body 12i.

The motor 20 includes the motor shaft 21, a rotor body 22, and the stator 23. The motor shaft 21 rotates with the central axis J1 as the center. The motor shaft 21 is supported by the first bearing 51 and the second bearing 52 to be rotatable around the central axis J1. The first bearing 51 is held by the bearing holder 100 and rotatably supports a part of the motor shaft 21 which is above the rotor body 22. The second bearing 52 supports a part of the motor shaft 21 below the rotor body 22 to be rotatable with respect to the deceleration mechanism case 13.

The upper end part of the motor shaft 21 protrudes toward the upper side with respect to the wall part 12b through the hole part 12h. The motor shaft 21 has an eccentric shaft part 21a centered on an eccentric axis J2 which is eccentric with respect to the central axis J1. The eccentric shaft part 21a is located below the rotor body 22. An inner ring of the third bearing 53 is fitted and fixed to the eccentric shaft part 21a. Thereby, the third bearing 53 is fixed to the motor shaft 21.

The rotor body 22 is fixed to the motor shaft 21. The motor 20 has a rotor including the motor shaft 21 and the rotor body 22. Although illustration is omitted, the rotor body 22 includes a rotor core in a cylindrical shape fixed to the outer circumferential surface of the motor shaft 21, and a magnet fixed to the rotor core. The stator 23 faces the rotor body 22 with a gap therebetween in the radial direction. The stator 23 surrounds the rotor body 22 on the radial-direction outer side of the rotor body 22. The stator 23 includes a stator core 24 in an annular shape surrounding the radial-direction outer side of the rotor body 22, an insulator 25 mounted to the stator core 24, and a plurality of coils 26 mounted to the stator core 24 via the insulator 25. The stator core 24 is fixed to the inner circumferential surface of the case cylinder part 12a. Thereby, the motor 20 is held by the motor case 12.

The control part 70 includes the control board 71, a second attachment member 73, a second magnet 74, and a second rotation sensor 72. That is, the electric actuator 10 includes the control board 71, the second attachment member 73, the second magnet 74, and the second rotation sensor 72.

The control board 71 is in a plate shape expanding in a plane orthogonal to the axial direction Z. The control board 71 is accommodated in the motor case 12. More specifically, the control board 71 is accommodated inside the control board accommodating part 12f and is disposed away from the wall part 12b toward the upper side. The control board 71 is a board which is electrically connected to the motor 20. The coils 26 of the stator 23 are electrically connected to the control board 71. The control board 71 controls, for example, a current supplied to the motor 20. That is, for example, an inverter circuit is mounted on the control board 71.

The second attachment member 73 is in an annular shape with the central axis J1 as the center. The inner circumferential surface of the second attachment member 73 is fixed to the upper end part of the motor shaft 21. The second attachment member 73 is disposed on the upper side of the first bearing 51 and the bearing holder 100. The second attachment member 73 is, for example, a non-magnetic material. Furthermore, the second attachment member 73 may also be a magnetic material.

The second magnet 74 is in an annular shape with the central axis J1 as the center. The second magnet 74 is fixed to the upper end surface of the radial-direction outer edge part of the second attachment member 73. A method for fixing the second magnet 74 to the second attachment member 73 is not particularly limited, and is, for example, adhesion with an adhesive. The second attachment member 73 and the second magnet 74 are rotated together with the motor shaft 21. The second magnet 74 is disposed on the upper side of the first bearing 51 and the holder cylinder part 101. The second magnet 74 has N poles and S poles alternately disposed along the circumferential direction.

The second rotation sensor 72 is a sensor which detects the rotation of the motor 20. The second rotation sensor 72 is attached to the lower surface of the control board 71. The second rotation sensor 72 faces the second magnet 74 with a gap therebetween in the axial direction Z. The second rotation sensor 72 detects the magnetic field generated by the second magnet 74. The second rotation sensor 72 is, for example, a Hall element. Although illustration is omitted, a plurality of (three, for example) second rotation sensors 72 are provided along the circumferential direction. The second rotation sensor 72 can detect the rotation of the motor shaft 21 by detecting a change in the magnetic field generated by the second magnet 74 which rotates together with the motor shaft 21.

The connector part 80 is a part where connection with electrical wiring outside the case 11 is performed. The connector part 80 is provided in the motor case 12. The connector part 80 includes the terminal holding part 12d described above and the terminal 81. The terminal 81 is embedded and held in the terminal holding part 12d. One end of the terminal 81 is fixed to the control board 71. The other end of the terminal 81 is exposed to the outside of the case 11 through the inside of the terminal holding part 12d. In the embodiment, the terminal 81 is, for example, a bus bar.

An external power source is connected to the connector part 80 via electrical wiring (not shown). More specifically, the external power source is attached to the terminal holding part 12d, and the electrical wiring of the external power source is electrically connected to a part of the terminal 81 protruding into the terminal holding part 12d. Accordingly, the terminal 81 electrically connects the control board 71 and the electrical wiring. Therefore, in the embodiment, power is supplied from the external power source to the coils 26 of the stator 23 via the terminal 81 and the control board 71.

The deceleration mechanism 30 is disposed on the radial-direction outer side of a part on the lower side of the motor shaft 21. The deceleration mechanism 30 is accommodated inside the deceleration mechanism case 13. The deceleration mechanism 30 is disposed between the bottom wall part 13a and the annular part 16b and the motor 20 in the axial direction Z. The deceleration mechanism 30 includes an external gear 31, the internal gear 33, and an output flange part 42.

The external gear 31 is in a substantially annular plate shape which expands in a plane orthogonal to the axial direction Z with the eccentric axis J2 of the eccentric shaft part 21a as the center. A gear part is provided on the radial-direction outer-side surface of the external gear 31. The external gear 31 is connected to the eccentric shaft part 21a via the third bearing 53. Thereby, the deceleration mechanism 30 is connected to the part on the lower side of the motor shaft 21. The external gear 31 is fitted to an outer ring of the third bearing 53 from the radial-direction outer side. Thereby, the third bearing 53 connects the motor shaft 21 and the external gear 31 to be relatively rotatable around the eccentric axis J2.

As shown in FIG. 2, the external gear 31 has a plurality of through holes 31a which penetrate the external gear 31 in the axial direction. The plurality of through holes 31a are disposed along the circumferential direction. More specifically, the plurality of through holes 31a are disposed at equal intervals all around along the circumferential direction with the eccentric axis J2 as the center. For example, eight through holes 31a are provided.

The internal gear 33 is fixed so as to surround the radial-direction outer side of the external gear 31 and meshes with the external gear 31. The internal gear 33 is in an annular shape with the central axis J1 as the center. As shown in FIG. 2, the internal gear 33 is located on the radial-direction inner side of the end part on the upper side of the cylindrical member 16. The internal gear 33 is fixed to the inner circumferential surface of the cylindrical member 16 made of metal. Therefore, the internal gear 33 can be firmly fixed to the deceleration mechanism case 13 while the deceleration mechanism case body 13i is made of resin. Thereby, the internal gear 33 can be prevented from moving with respect to the deceleration mechanism case 13, and shift of the position of the internal gear 33 can be prevented. In the embodiment, the internal gear 33 is fixed to the inner circumferential surface of the large diameter part 16a by press fitting. In this way, the deceleration mechanism 30 is fixed to the inner circumferential surface of the cylindrical member 16 and is held by the deceleration mechanism case 13. A gear part is provided on the inner circumferential surface of the internal gear 33. The gear part of the internal gear 33 meshes with the gear part of the external gear 31. More specifically, the gear part of the internal gear 33 partially meshes with the gear part of the external gear 31.

The output flange part 42 is a part of the output part 40. The output flange part 42 is located on the lower side of the external gear 31. The output flange part 42 is in an annular plate shape which expands in the radial direction with the central axis J1 as the center. The output flange part 42 expands from the end part on the upper side of the output shaft 41 (to be described later) toward the radial-direction outer side. As shown in FIG. 2, the output flange part 42 is in contact with the bush flange part 54a from the upper side.

The output flange part 42 has a plurality of through holes 42a which penetrate the output flange part 42 in the axial direction Z. Although illustration is omitted, the plurality of through holes 42a are disposed along the circumferential direction. More specifically, the plurality of through holes 42a are disposed at equal intervals all around along the circumferential direction with the central axis J1 as the center. For example, eight through holes 42a are provided.

Column members 43 are respectively inserted into the through holes 42a of the output flange part 42. The plurality of column members 43 are columnar members extending in the axial direction Z. The column members 43 are fixed to the output flange part 42 by press fitting, adhesion, screw fastening, or the like. The column members 43 protrude from the top surface of the output flange part 42 toward the upper side. The plurality of column members 43 are disposed along the circumferential direction. More specifically, the plurality of column members 43 are disposed at equal intervals all around along the circumferential direction with the central axis J1 as the center.

The column members 43 extend from the output flange part 42 toward the upper side and are respectively inserted into the plurality of through holes 31a of the external gear 31. The diameter of the through hole 31a is larger than the diameter of the column member 43. The column member 43 disposed inside the through hole 31a is capable of circular movement along the inner circumferential surface of the through hole 31a. With this configuration, the external gear 31 swings around the central axis J1.

The output part 40 is a part which outputs a driving force of the electric actuator 10. The output part 40 is accommodated in the deceleration mechanism case 13. The output part 40 includes the output shaft 41 and the output flange part 42. That is, the electric actuator 10 includes the output shaft 41 and the output flange part 42. In the embodiment, the output part 40 is a single member.

The output shaft 41 extends in the axial direction Z of the motor shaft 21 on the lower side of the motor shaft 21. The output shaft 41 includes a cylindrical part 41a and an output shaft body part 41b. The cylindrical part 41a is in a cylindrical shape which extends from the inner edge of the output flange part 42 toward the lower side. The cylindrical part 41a is in a cylindrical shape that has a bottom part and opens on the upper side. The cylindrical part 41a is fitted to the radial-direction inner side of the bush 54. Accordingly, the output shaft 41 is rotatably supported by the cylindrical member 16 via the bush 54. As described above, the deceleration mechanism 30 is fixed to the cylindrical member 16. Therefore, the deceleration mechanism 30 and the output shaft 41 can be supported together by the cylindrical member 16 made of metal. Thereby, the deceleration mechanism 30 and the output shaft 41 can be disposed with good axial accuracy.

The second bearing 52 is accommodated inside the cylindrical part 41a. An outer ring of the second bearing 52 is fitted inside the cylindrical part 41a. Thereby, the second bearing 52 connects the motor shaft 21 and the output shaft 41 to be rotatable relative to each other. The lower end part of the motor shaft 21 is located inside the cylindrical part 41a. The lower end surface of the motor shaft 21 faces the top surface of the bottom part of the cylindrical part 41a with a gap therebetween.

The output shaft body part 41b extends from the bottom part of the cylindrical part 41a toward the lower side. In the embodiment, the output shaft body part 41b is in a columnar shape with the central axis J1 as the center. The outer diameter of the output shaft body part 41b is smaller than the outer diameter and the inner diameter of the cylindrical part 41a. The lower end part of the output shaft body part 41b protrudes below the protruding cylinder part 13c. Another member to which the driving force of the electric actuator 10 is output is attached to the lower end part of the output shaft body part 41b.

When the motor shaft 21 is rotated around the central axis J1, the eccentric shaft part 21a revolves in the circumferential direction with the central axis J1 as the center. The revolution of the eccentric shaft part 21a is transmitted to the external gear 31 via the third bearing 53, and the external gear 31 swings while an inscribed position between the inner circumferential surface of the through hole 42a and the outer circumferential surface of the column member 43 changes. Accordingly, the position where the gear part of the external gear 31 and the gear part of the internal gear 33 mesh with each other changes in the circumferential direction. Therefore, a rotational force of the motor shaft 21 is transmitted to the internal gear 33 via the external gear 31.

Here, in the embodiment, since the internal gear 33 is fixed, the internal gear 33 does not rotate. Therefore, the external gear 31 rotates around the eccentric axis J2 due to a reaction force of the rotational force transmitted to the internal gear 33. At this time, a rotating direction of the external gear 31 is opposite to a rotating direction of the motor shaft 21. The rotation of the external gear 31 around the eccentric axis J2 is transmitted to the output flange part 42 via the through hole 42a and the column member 43. Thereby, the output shaft 41 rotates around the central axis J1. In this way, the rotation of the motor shaft 21 is transmitted to the output shaft 41 via the deceleration mechanism 30.

The rotation of the output shaft 41 is decelerated with respect to the rotation of the motor shaft 21 by the deceleration mechanism 30. Specifically, in the configuration of the deceleration mechanism 30 of the embodiment, a reduction ratio R of the rotation of the output shaft 41 with respect to the rotation of the motor shaft 21 is represented by $R=-(N2-N1)/N1$. The negative sign at the head of the equation representing the reduction ratio R indicates that the direction of rotation of the output shaft 41 which is decelerated is opposite to the direction of the rotation of the motor shaft 21. N1 is the number of teeth of the external gear 31, and N2 is the number of teeth of the internal gear 33. As an example, when the number of teeth N1 of the external gear 31 is 59 and the number of teeth N2 of the internal gear 33 is 60, the reduction ratio R is $-1/59$.

Thus, according to the deceleration mechanism 30 of the embodiment, the reduction ratio R of the rotation of the output shaft 41 with respect to the rotation of the motor shaft 21 can be made relatively large. Therefore, the rotational torque of the output shaft 41 can be made relatively large.

The wiring member 90 is electrically connected to a first rotation sensor 61 to be described later. In the embodiment, the wiring member 90 is a member for connecting the first rotation sensor 61 of the rotation detection device 60 and the control board 71 of the control part 70. In the embodiment, the wiring member 90 is an elongated and plate-shaped bus bar. Although illustration is omitted, in the embodiment, three wiring members 90 are provided. Each wiring member 90 is configured by connecting a first wiring member 91 and a second wiring member 92.

The first wiring member 91 extends from the inside of the second wiring holding part 15 to the inside of the control board accommodating part 12f. A part of the first wiring member 91 is embedded in the first wiring holding part 14, the case cylinder part 12a, and the wall part body 12i. Thereby, the first wiring member 91 is held by the motor case 12.

A lower end part 91a of the first wiring member 91 protrudes from the first wiring holding part 14 toward the lower side and is located inside the second wiring holding part 15. An upper end part 91b of the first wiring member 91 protrudes from the wall part body 12i toward the upper side and is connected to the control board 71. Thereby, the first wiring member 91 is electrically connected to the control board 71 and is electrically connected to the electrical wiring outside the case 11 via the connector part 80.

A part of the second wiring member 92 is embedded in the bottom part 13j. Thereby, the second wiring member 92 is held by the deceleration mechanism case 13. An upper end part 92a of the second wiring member 92 protrudes from the bottom wall part 15a toward the upper side. The upper end part 92a of the second wiring member 92 is connected to the lower end part 91a of the first wiring member 91. A lower end part 92b of the second wiring member 92 penetrates the bottom part 13*j* and protrudes into the concave part 17. The lower end part 92*b* corresponds to one end part of the wiring member 90. Thereby, the wiring member 90 penetrates the case 11 from the inside of the case 11, and one end part of the wiring member 90 protrudes into the concave part 17.

The rotation detection device 60 detects the rotation of the output part 40. The rotation detection device 60 includes the first magnet 63, a covering part 62, and the first rotation sensor 61. The first magnet 63 is in an annular shape with the central axis J1 as the center. The first magnet 63 is attached to the output part 40. The first magnet 63 is located on the lower side of the lower surface 42*b* of the output flange part 42. The end part on the lower side of the first magnet 63 faces the upper side of the annular part 16*b* with a gap therebetween.

The first rotation sensor 61 is located inside the concave part 17. The first rotation sensor 61 is located on the lower side of the first magnet 63 with the annular part 16*b* interposed therebetween. The first rotation sensor 61 is a magnetic sensor which detects the magnetic field generated by the first magnet 63. The first rotation sensor 61 is, for example, a Hall element. The first rotation sensor 61 can detect the rotation of the output part 40 by detecting a change in the magnetic field generated by the first magnet 63 which rotates together with the output part 40. Here, according to the embodiment, the cylindrical member 16 is a non-magnetic material. Therefore, even if the cylindrical member 16 is located between the first magnet 63 and the first rotation sensor 61, the detection accuracy of the magnetic field of the first magnet 63 by the first rotation sensor 61 can be suppressed from decreasing.

The covering part 62 is located inside the concave part 17. In the embodiment, the covering part 62 is filled inside the concave part 17. The covering part 62 is made of resin. The lower end part 92*b* of the second wiring member 92, that is, one end part of the wiring member 90 and the first rotation sensor 61 are embedded and covered in the covering part 62. Therefore, moisture or the like can be prevented from coming into contact with the one end part of the wiring member 90 and the first rotation sensor 61 located in the concave part 17.

The use of the electric actuator of the above-described embodiment is not limited, and the electric actuator of the above-described embodiment may be mounted on any equipment. The electric actuator of the above-described embodiment is mounted, for example, on a vehicle. In addition, each configuration described in this specification can be combined as appropriate in a range in which the configurations are not mutually contradictory.

What is claimed is:

1. An electric actuator, comprising:
a motor which comprises:
a rotor having a motor shaft extending along a central axis; and
a stator facing the rotor in a radial direction; and
a deceleration mechanism connected to one axial-direction side of the motor shaft,
wherein the motor comprises a motor case having a first opening end surface that opens on the one axial-direction side,
the deceleration mechanism comprises a deceleration mechanism case having a second opening end surface that opens on an other axial-direction side,
the motor case and the deceleration mechanism case are connected in an axial direction via an annular sealing member disposed between the first opening end surface and the second opening end surface,
the first opening end surface comprises a first end surface body part in a circular arc shape extending in a circumferential direction, and a first end surface protrusion part protruding in an arc shape from the first end surface body part toward a radial-direction outer side,
the second opening end surface comprises a second end surface body part in a circular arc shape extending in the circumferential direction, and a second end surface protrusion part protruding in an arc shape from the second end surface body part toward the radial-direction outer side and facing the first end surface protrusion part,
the sealing member comprises a body part sealing part disposed between the first end surface body part and the second end surface body part, and a protrusion part sealing part disposed between the first end surface protrusion part and the second end surface protrusion part,
the protrusion part sealing part comprises an axial-direction protrusion that protrudes from a surface directed to the axial direction toward the one axial-direction side or the other axial-direction side, and
the axial-direction protrusion faces a side surface of the motor case in the first end surface protrusion part or a side surface of the deceleration mechanism case in the second end surface protrusion part in the circumferential direction.

2. The electric actuator according to claim 1, wherein the axial-direction protrusion is in an arc shape extending along the protrusion part sealing part.

3. The electric actuator according to claim 1, wherein the protrusion part sealing part comprises a first arm and a second arm respectively extending along the radial direction, and
each of the first arm and the second arm comprises the axial-direction protrusion.

4. The electric actuator according to claim 2, wherein the axial-direction protrusion is located at an end part on an inner circumferential side of the protrusion part sealing part.

5. The electric actuator according to claim 3, wherein the axial-direction protrusion is located at an end part on an inner circumferential side of the protrusion part sealing part.

6. The electric actuator according to claim 1, wherein the motor case comprises a first positioning wall part that protrudes from the first opening end surface toward the one axial-direction side and extends along the first opening end surface.

7. The electric actuator according to claim 6, wherein the first positioning wall part is located at an inner circumferential end of the first opening end surface.

8. The electric actuator according to claim 1, wherein the deceleration mechanism case comprises a second positioning wall part that protrudes from the second opening end surface toward the other axial-direction side and extends along the second opening end surface.

9. The electric actuator according to claim 8, wherein the second positioning wall part is located at an inner circumferential end of the second opening end surface.

* * * * *